United States Patent
Chiu et al.

(10) Patent No.: US 7,420,569 B2
(45) Date of Patent: Sep. 2, 2008

(54) ADAPTIVE PIXEL-BASED BLENDING METHOD AND SYSTEM

(75) Inventors: An-Te Chiu, Taipei (TW); Roger Lin, Taipei (TW); Denzel Wang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 684 days.

(21) Appl. No.: 10/851,101

(22) Filed: May 24, 2004

(65) Prior Publication Data

US 2004/0233333 A1 Nov. 25, 2004

(51) Int. Cl.
G09G 5/00 (2006.01)
G09G 5/02 (2006.01)
G09G 5/10 (2006.01)

(52) U.S. Cl. .................. 345/592; 345/629; 345/640

(58) Field of Classification Search ............... 345/592, 345/629, 639, 640, 641, 600, 601
See application file for complete search history.

(56) References Cited

U.S. PATENT DOCUMENTS 6,023,302 A * 2/2000 MacInnis et al. ............ 348/597

* cited by examiner

*Primary Examiner*—Kee M. Tung
*Assistant Examiner*—Hau H Nguyen

(57) ABSTRACT

An adaptive pixel-based blending method and system of a video processing system including steps of acquiring a first pixel value in accordance with a first index value, acquiring a first blending factor in accordance with the parts of the first pixel value, calculating a second blending factor in accordance with the first blending factor, and generating a overlapped and blended image in accordance with the blending factors and the pixel values of the source images. Thus, multiple source images can be overlapped and blended in a flexible way.

12 Claims, 3 Drawing Sheets

ADAPTIVE PIXEL-BASED BLENDING METHOD AND SYSTEM

BACKGROUND OF THE INVENTION

1. Field of the Invention

The present invention generally relates to a method for overlapping between graphic and video images, and more particularly to a method and system of adaptive pixel-based blending for overlapping between graphic and video images.

2. Description of the Prior Art

In the frame display field of the dynamic images, the single frame buffer architecture and the dual frame buffer architecture are usually used to merge and display graphic and video images. The dual frame buffer architecture is configured to blend two respectively separate frame buffers for displaying each pixel of an image, while the video image subsystem and the graphic image subsystem respectively uses a single frame buffer for processing. Since the pixel streams of the two subsystems are processed simultaneously, thus we consider that the pixels of graphic images are overlapped with the pixels of video images under that. Accordingly, when deciding not to display some pixels of graphic images, upon the pixels of video images that are under the pixels of graphic images will be displayed. In general, the method of deciding to alternatively display video images or graphic images in the dual frame buffer architecture is to find chroma keying by looking up a particular color entry of the color lookup table. Besides, another method of that is black detection; in this regard, using the principle that black is mostly easy to be detected and therefore takes black as one kind of chroma keying. Both of the two methods described above take the pixels of graphic images as transparency and then video images will be displayed when a particular color (for instance, chroma keying or black) in the pixel streams is detected.

Since many video image systems need to adopt the blending method of video and graphic images for display, they usually adopt the method for display of a particular block by using chroma keying or black detection. FIG. 1 depicts a conventional method for overlapping between graphic and video images. Display frame 150 is composed of video image 100 and graphic image 110, wherein video image 100 and graphic image 110 respectively send the corresponding pixels relative to display frame 150 at the same time. The overlapped area 120 of graphic image 110 can be filled with chroma keying, and using a detector 140 to detect whether it has chroma keying or not when the pixel streams of graphic image are sent to multiplexer 130. When the detecting result shows that it has chroma keying, and then multiplexer 130 chooses pixels of video image 100 for output; otherwise, choosing pixels of graphic image 110 for output.

Although we can use the method described above to make video images to be overlapped with graphic images, or blending video and graphic images with a certain blending factor for achieving an effect of transparency mix, but its flexibility is restricted. In this regard, for instance when using ¼ RGB color value of video image and ¾ RGB color value of graphic image as the pixels of a particular area for output, resulting in an effect of overlap and semi-transparency, but the method with fixed blending factor is less flexibility in the application of dynamic images. For instance, when requiring blending of overlapped area in different ways of transparency, or producing an effect of fade-in and fade-out, the flexibility of the method described above is restricted.

SUMMARY OF THE INVENTION

The present invention provides an adaptive pixel-based blending method which comprises the steps, acquiring a first source pixel value in accordance with a first index value and acquiring a blending factor in accordance with the first source pixel value; calculating a second blending factor in accordance with the first blending factor; and calculating an output pixel in accordance with the first source pixel value, the first blending factor, a second source pixel value and the second blending factor.

The present invention also provides a method of video processing for generating a blending factor which comprises the steps, extracting a corresponding source pixel value in accordance with an index value; generating a blending factor in accordance with a partial bits of the corresponding source pixel value.

Besides, the present invention provides an adaptive pixel-based blending system which comprises the means: a blending factor generating unit which is configured to generate a blending factor in accordance with a partial bits of a pixel value of graphics/video image; and a mixer which is configured to output a destination pixel value in accordance with a plurality of pixel values of graphics/video images and a plurality of corresponding blending factors.

Accordingly, the method and system according to the present invention can dynamically change the blending factor of pixels by a programmable procedure in the pixels extracting process; and it is therefore increase the flexibility and applications of overlap between multi-input video images and graphic images.

BRIEF DESCRIPTION OF THE DRAWING

The present invention can be best understood through the following description and accompanying drawings, wherein.

DESCRIPTION OF THE PREFERRED EMBODIMENT

Some appropriate and preferred embodiments of the present invention will now be described in the following. It should be noted, however, that the embodiment is merely an example and can be variously modified without departing from the range of the present invention.

It is to be understood, however, that the drawings, which are not to scale, are designed for the purpose of illustration and not as a definition of the limits of the invention, for which reference should be made to the appended claims.

Figure 1:
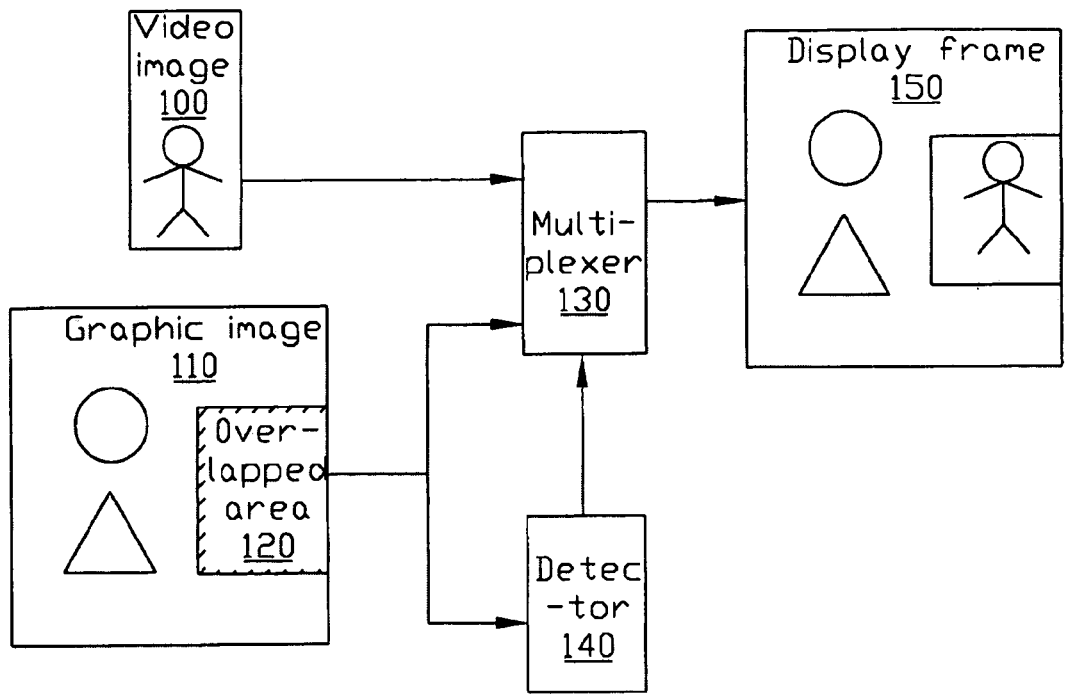
FIG. 1 schematically shows the diagram of conventional method for overlapping between graphic and video image.
Figure 2:
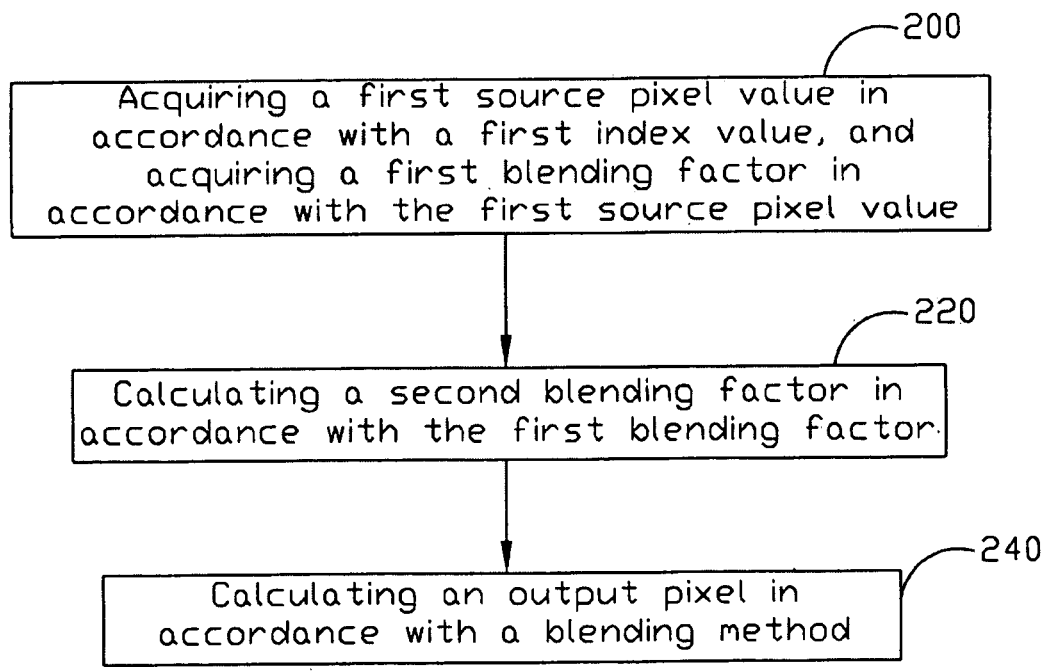
FIG. 2 schematically shows the flow chart of the adaptive pixel-based blending system according to one embodiment of the present invention.

FIG. 2 schematically shows the flow chart of the adaptive pixel-based blending system according to one embodiment of the present invention. Step 200 is acquiring a first source pixel value in accordance with a first index value and acquiring a first blending factor in accordance with the first source pixel value. Further, using the way that searching for a color entry index value of a memory component substantially commensurate with the first index value for extracting the first source pixel value and the corresponding first blending factor. And the corresponding first blending factor can be composed of partial bits of the first source pixel value. For instance, at least one bit represents each of the RGB color value and thus forms eight kinds of the value. Furthermore, filling the partial bits of the first source pixel value for recovering the format of the first source pixel value. Besides, forming a second index value by the partial bits of the first source pixel value and then acquiring the first blending factor by a color lookup table; and dynamically changing the first blending factor of the first source pixel value by a programmable procedure. In the following, step 220 is calculating a second blending factor in accordance with the first blending factor; for instance, we can acquire the second blending factor by subtracting the first blending factor from one. Next, step 240 calculates an output pixel in accordance with the first source pixel value, the first blending factor, a second source pixel value and the second blending factor. This step includes calculating a first product of the first blending factor and the first source pixel value; calculating a second product of the difference between one and the first blending factor and the second source pixel value; calculating the sum of the first product and the second product and then being the output pixel. It should be appreciated that the sum of the blending factors described above is not restricted for one; instead, determining each blending factor in accordance with different display requirements. In this regard, the sum of the blending factors can be determined according to a predetermined maximum of the color value.

Figure 3:
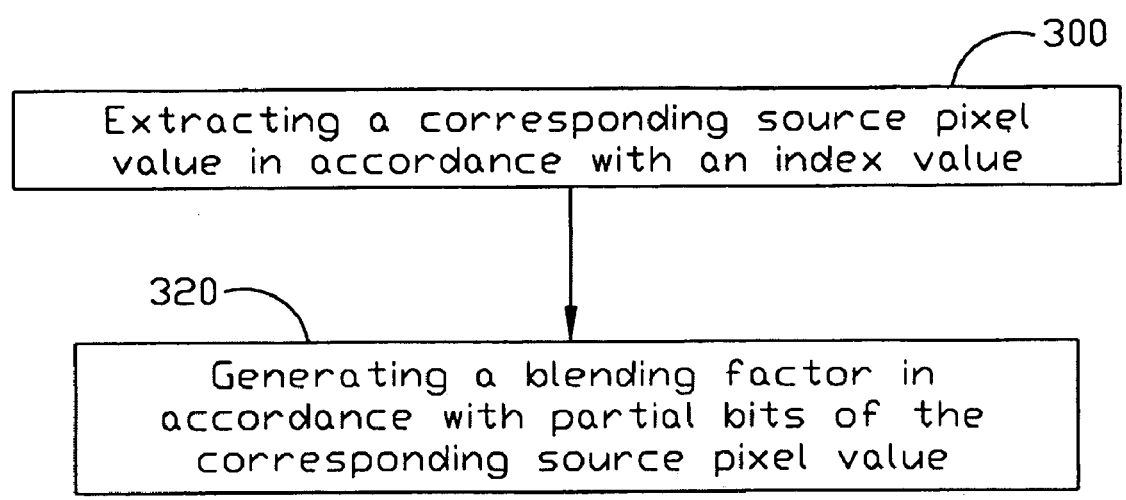
FIG. 3 schematically shows the diagram of the method of video processing for generating a blending factor according to one embodiment of the present invention.

FIG. 3 schematically shows the diagram of the method of video processing for generating a blending factor according to one embodiment of the present invention. Step 300 is extracting a corresponding source pixel value in accordance with an index value. Next, step 320 is generating a blending factor in accordance with partial bits of the corresponding source pixel value. The content of the corresponding source pixel value can be RGB color value, and generally using 8-bits red value, 8-bits green value and 8-bits blue value in true color mode. And the value composed of the partial bits of the corresponding source pixel value can be taken as the blending factor. Otherwise, taking the index value composed of the partial bits of the corresponding source pixel value as a basis for indexing a color lookup table and then generating the blending factor.

Figure 4:
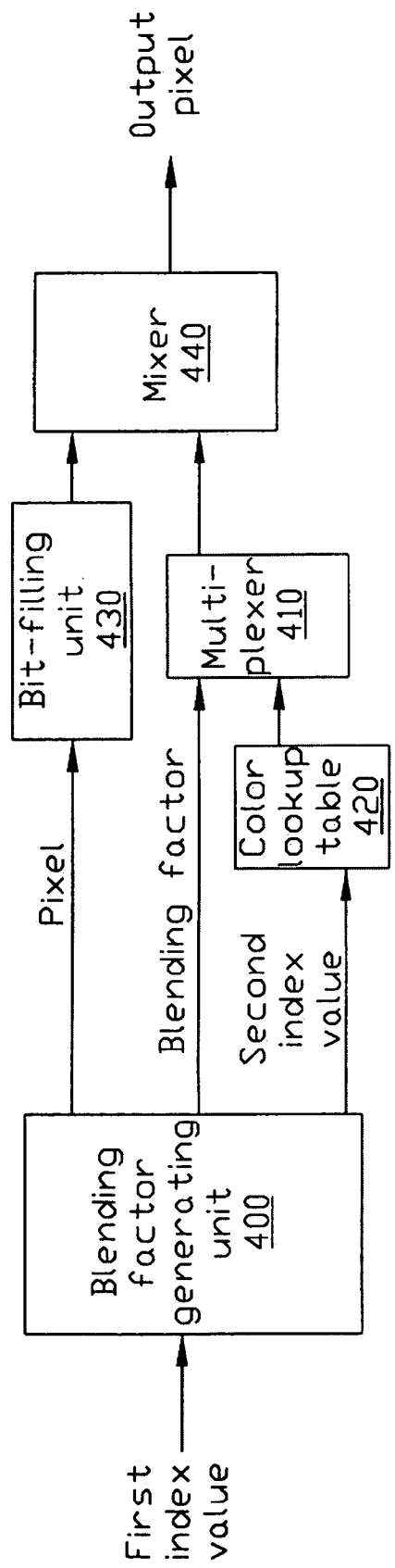
FIG. 4 schematically shows the diagram of the adaptive pixel-based blending method according to one embodiment of the present invention.

FIG. 4 schematically shows the diagram of the adaptive pixel-based blending method according to one embodiment of the present invention. The adaptive pixel-based blending system includes: a blending factor generating unit 400 which is configured to generate a blending factor in accordance with partial bits of a source pixel value of graphics/video image; a mixer 440 which is configured to output a destination pixel value in accordance with a plurality of source pixel values of graphics/video images and a plurality of corresponding blending factors. Further, the adaptive pixel-based blending system includes a bit filling unit 430 which is configured to fill the partial bits of the source pixel value of graphics/video image in accordance with a filling algorithm and then send to the mixer 440. The adaptive pixel-based blending system can also include a multiplexer 410 which is configured to alternatively choose the blending factor generated from the value composed of the partial bits of the source pixel value of graphics/video image, and the blending factor generated from taking an index value composed of the partial bits as a basis for indexing a color lookup table; and then send the blending factor to the mixer 440. Besides, the adaptive pixel-based blending system includes a color lookup table, configured to look up the blending factor by the index value composed of the partial bits.

The adaptive pixel-based blending method according to the present invention can be represented as the following, wherein:

red value of the output pixel=red value of the first source pixel×blending factor+red value of the second source pixel×(1-blending factor)

green value of the output pixel=green value of the first source pixel×blending factor+green value of the second source pixel×(1-blending factor)

blue value of the output pixel=blue value of the first source pixel×blending factor+blue value of the second source pixel×(1-blending factor)

Therefore, it represents that only the second source pixel is displayed when the blending factor is zero; similarly, only the first source pixel is displayed when the blending factor is one; it represents that two pixels are displayed when the blending factor is greater than zero and lower than one. Accordingly, when blending the second source pixel of the same color with the different blending factors and the first source pixel, we can use certain color entries that have the same pixel content and different blending factors to achieve that. Otherwise, we can use a program for dynamically adjusting the content of the blending factor. Besides, the bits adopted by the pixels and the color values can be adjustable in accordance with different requirements and formats, which are not restricted for 24 bits and 8 bits. For instance, red value, green value and blue value of the first source pixel are all 100; red value, green value and blue value of the second source pixel are all 200; and the blending factor is 40% results in that red value, green value and blue value of the output pixel are all 160 (That is, 100× 40%+200×(1-40%)). Therefore, when the blending factors are 100%, 75%, 50%, 25% and 0% respectively at different timing, then the color content of the output pixel will be gradually changed from the color content of the first pixel to the color content of the second source pixel. On the varying process, the output pixel is displayed as an overlap between the first source pixel and the second source pixel with different extents.

Besides, the present invention has different applications. For instance, filling the output pixel of a particular area with different colors (a range from higher to lower in accordance with the blending factor) by using the way of changing the content of pixels and adjusting the blending factor; thus it can achieve an effect of being gradually changed from the first pixel to the second source pixel. The adaptive pixel-based blending method can be used in display captions and function sheets; otherwise, an overlap of images in the way of semi-transparency to make users to see two full frames at the same time. The characteristics of the method is no need to input the blending factor of each output pixel; instead, amend the content of the pixel value in the color lookup table. Accordingly, it can increase the flexibility of blending and save the cost of storage and receiving the blending factor when the range of the display frame is very large. For instance, when each blending factor requires 8 bits to represent a frame with 1024×768 resolution, it requires saving 786,423 byte and then sending that; but, when using the architecture of the adaptive pixel-based blending method according to the present invention, it will save the storage space and the cost.

While this invention has been described with reference to illustrative embodiments, this description does not intend or construe in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An adaptive pixel-based blending method, comprising:
   acquiring a first source pixel value according to a first index value by searching for a color entry index value in a color look-up table substantially commensurate with said first index value for extracting said first source pixel value;
   choosing alternatively of a first blending factor generated from the value composed of partial bits of said first source pixel value, and said blending factor generated from forming a second index value composed of said first source pixel value as a basic for indexing a color lookup table;
   calculating a second blending factor in accordance with said first blending factor; and
   calculating an output pixel in accordance with said first source pixel value, said first blending factor, a second source pixel value and said second blending factor.

2. The method according to claim 1, further comprising:
   filling said partial bits of said first source pixel value for recovering the format of said first source pixel value.

3. The method according to claim 1, further comprising:
   changing dynamically said first blending factor of said first source pixel value by a programmable procedure.

4. The method according to claim 1, wherein said calculating an output pixel comprises:
   calculating a first product of said first blending factor and said first source pixel value;
   calculating a second product of the different between one and said first blending factor and said second source pixel value; and
   calculating the sum of said first product and said second product and then being said output pixel.

5. The method according to claim 1, wherein said step of choosing alternatively said two blending factors is in accordance with a multiplexer.

6. A method of video processing for generating a blending factor, comprising:
   extracting a corresponding source pixel value in accordance with a first index value by searching for a color entry index value in a color look-up table substantially commensurate with said first index value; and
   choosing alternatively of a blending factor generated from the value composed of partial bits of said source pixel value, and said blending factor generated from forming a second index value composed of said source pixel value as a basis for indexing said color lookup table.

7. The method according to claim 6, comprising:
   taking the value composed of said partial bits of said corresponding source pixel value as said blending factor.

8. The method according to claim 6, comprising:
   taking said index value composed of said partial bits of said corresponding source pixel value as a basis for indexing said color lookup table for generating said blending factor.

9. The method according to claim 6, wherein said step of choosing alternatively said two blending factors is in accordance with a multiplexer.

10. An adaptive pixel-based blending system, comprising:
    a blending factor generating unit, configured to generate a blending factor in accordance with partial bits of a pixel value of graphics/video images;
    a multiplexer, configured to choose alternatively of said blending factor generated from the value composed of said partial bits of said pixel value of graphics/video images, and said blending factor generated from taking an index value composed of said partial bits as a basis for indexing a color lookup table; and
    a mixer, configured to output a destination pixel value in accordance with a plurality of said pixel values of graphics/video images and a plurality of said corresponding blending factors.

11. The system according to claim 10, comprising:
    a bit filling unit, configured to fill said partial bits of said pixel value of graphics/video images in accordance with a filling algorithm and then send to said mixer.

12. The system according to claim 10, wherein said color lookup table is configured to look up said blending factor by said index value composed of said partial bits.

* * * * *

UNITED STATES PATENT AND TRADEMARK OFFICE
CERTIFICATE OF CORRECTION

| | | |
|---|---|---|
| PATENT NO. | : 7,420,569 B2 | |
| APPLICATION NO. | : 10/851101 | |
| DATED | : September 2, 2008 | |
| INVENTOR(S) | : An-Te Chiu, Roger Lin and Denzel Wang | |

It is certified that error appears in the above-identified patent and that said Letters Patent is hereby corrected as shown below:

Title Page; item (63);
The "Related U.S. Application Data" on page 1 of the above-referenced patent has been added to read "Provisional application No. 60/472,732, filed on May 23, 2003."

Signed and Sealed this
Fifth Day of April, 2011

David J. Kappos
*Director of the United States Patent and Trademark Office*